March 3, 1931. T. H. NYE 1,795,137
CONVEYING MEANS AND METHOD
Filed Aug. 16, 1928   3 Sheets-Sheet 1

Inventor
Theodore H. Nye.
By Geo. H. Kennedy Jr.
Attorney

Inventor
Theodore H. Nye.
By Geo. H. Kennedy Jr.
Attorney

March 3, 1931. T. H. NYE 1,795,137
CONVEYING MEANS AND METHOD
Filed Aug. 16, 1928  3 Sheets-Sheet 3

Inventor
Theodore H. Nye.
By Geo. H. Kennedy Jr.
Attorney

Patented Mar. 3, 1931

1,795,137

UNITED STATES PATENT OFFICE

THEODORE H. NYE, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS

CONVEYING MEANS AND METHOD

Application filed August 16, 1928. Serial No. 300,095.

The invention relates to conveying, as exemplified by the use of a series of substantially alined rotatable rollers for the support and movement of various kinds of articles or materials, especially in more or less elongated pieces, such as lumber, or the various rolled products of a steel mill.

The invention involves a radically new principle in the conveying of material on rollers, as brought into play by the special construction and arrangement of the roller units that constitute the roller conveyor; through the operation thereof, new and valuable results are obtained in the mechanical forwarding, handling and disposal of the conveyed pieces or materials, by way of procuring, normally, the centralization of the same on the conveyor rollers, while at the same time affording opportunity, whenever desired, of securing sidewise movement, for broadside discharge from the conveyor in either direction, in the absence of any thrust or deflection applied to the sides of said material.

The several features, advantages and characteristics of the invention are set forth more fully hereinafter, reference being had for an illustration of the same to the accompanying drawings, in which Fig. 1 is a detached view, partly in elevation and partly in section, of a roller unit embodying the invention, and adapted for use, for example, in the conveyor assemblages illustrated by Figs. 2, 3 and 4.

Like reference characters refer to like parts in the different figures.

Figure 1:
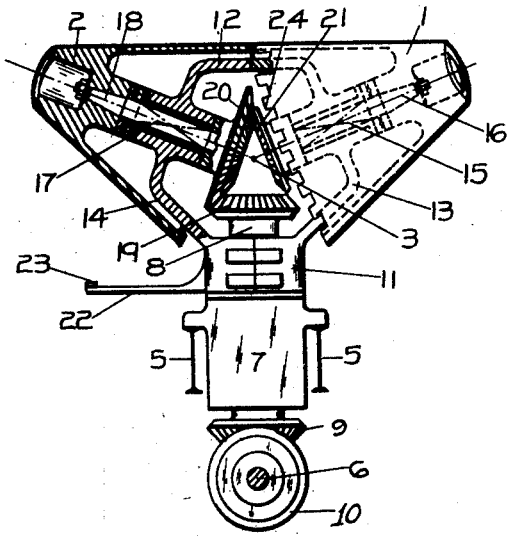
Figure 2:
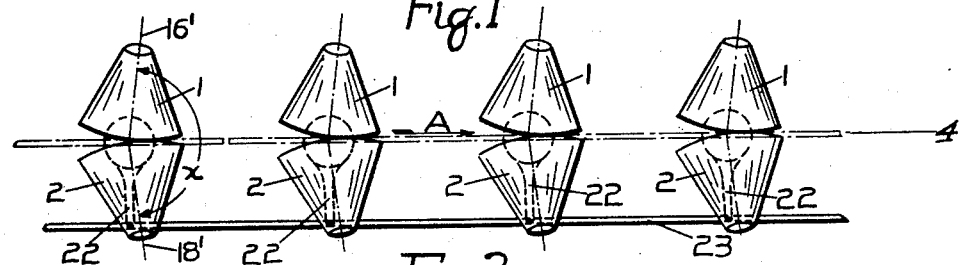
Fig. 2 is a top plan view, somewhat diagrammatic in character, showing a plurality of such roller units as assembled to form a conveyor.

Referring first to Fig. 2, the roller conveyor therein shown consists of a series of alined roller units, each unit comprising a pair of frusto-conical rollers 1, 2 arranged with their sections of larger diameter substantially end to end. As shown in Fig. 1, the two rollers 1, 2 of each unit are so mounted as to dispose their peripheral stock-supporting portions in a common substantially horizontal plane, the respective axes of said rollers for this purpose being tipped upwardly from the point 3 which represents the intersection of said axes. Furthermore, as best shown in Fig. 2, said axes, instead of being at right angles to the normal direction of travel of stock on the conveyor (as illustrated by the arrow A, Fig. 2) have a slight forward inclination in the direction of arrow A; in other words, said axes are so skewed with reference to the center line 4 of the conveyor, as to cause the rollers 1 and 2 of each pair to work together, in maintaining the conveyed material substantially on said center line.

With said axes so skewed forwardly, as shown in Fig. 2, it is apparent that the tendency of the rollers 1, 1 of the several units, in conveying stock forward in the direction of the arrow A, is to urge said stock sidewise toward said center line 4,—and that an opposite sidewise urge toward said center line 4 is produced by the oppositely skewed rollers 2, 2 of the several units. The net result, of course, is that these opposing sidewise tendencies will neutralize each other, in consequence of which any stock travelling longitudinally on the several roller units will automatically be maintained in a centralized position; if said stock, from any cause whatsoever, is diverted in whole or in part from said centralized position, to one side or the other thereof, the skewed rollers 1, 1 or 2, 2 as the case may be, operate immediately to restore the alinement. This maintenance of the stock on the center line of the conveyor is accomplished in the entire absence of any side guides or the like, or of any elements or parts brought either frictionally or forcibly into sidewise contact with the stock for the purpose of correcting or maintaining the latter's alinement; the action by which the centralized position is maintained is wholly a function of the roller units themselves due to the opposite skewing of their cooperative opposed portions 1 and 2.

Each of the roller units of the conveyor shown in Fig. 2 may be of the construction depicted in Fig. 1, whereon is shown also the sub-structure of the conveyor, in the form of a pair of beams 5, 5 extending longitudinally of the conveyor for the support of the several units, all of which, as here shown, may be driven from a common longitudinally-extending drive shaft 6 underlying said beams. Each unit comprises a stationary base member 7 that bridges said beams 5, 5 and that provides suitable bearings for a vertical shaft 8 whose lower end carries a bevel gear 9 in mesh with a similar gear 10 on the common drive shaft 6. Superposed on the base member 7 is a hub 11 formed on the roller-carrier 12 of the unit, said hub surrounding and being free to turn with relation to the upper end of the vertical shaft 8. Said roller-carrier 12, above said hub 11, provides opposite lateral parts or extensions 13 and 14, the former providing a suitable bearing 15 of the requisite inclination and skew for the shaft 16 of roller 1, and the latter providing a similar bearing 17 for the shaft 18 of roller 2,—it being understood that the axes of said shafts 16 and 18 have, in each instance, the forwardly skewed relation as represented by the lines 16' and 18' on Fig. 2.

At its extreme upper end, above the hub 11 and within the hollow interior of the roller-carrier 12, the shaft 8 carries a bevel pinion 19, with which meshes a bevel gear 20 on the upwardly inclined and forwardly skewed shaft 18; in this way, rotation is imparted to the roller portion 2 of each unit, in a clockwise direction, looking towards the center line 4 in Fig. 2 or as viewed from the left, Fig. 1. Similar rotation, in the same direction and at the same speed, is imparted to the roller 1 of each unit, through the medium of a bevel gear 21 on the inner end of shaft 16, which has the same number of teeth as and is in constant mesh with bevel gear 20 on shaft 18. The above described mechanism represents one method of securing the drive of the roller portions 1 and 2 of the several conveyor units; other alternative methods are available, as for instance, the methods shown in subsequent figures of the drawings herein, as hereinafter described.

Projecting from each hub 11 of the several roller-carriers 12 is an arm 22, all of said arms being connected by a longitudinally extending bar 23, which may be made shiftable back and forth to procure oscillation in unison of the several hub portions 11 about the vertical axes of their respective shafts 8, 8. In this way, the several conveyor units are made susceptible to various dispositions of their axial lines 16' and 18' with reference to the center line 4 of the conveyor, without varying, however, the constant angle between said lines, as represented at X, Fig. 2. The utility of this angular displacement, as imparted in unison to a plurality of units is evident from a consideration of the diagrams of Figs. 3 and 4.

Figure 3:
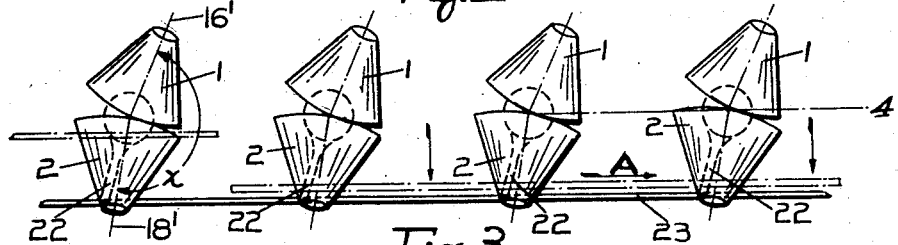
Figs. 3 and 4 are views similar to Fig. 2, illustrating different positions into which the roller units are movable, to secure the broadside discharge of the conveyed material, in one direction or the other.
Figure 4:
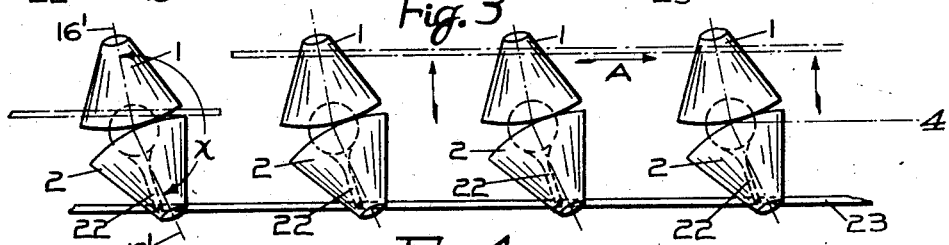

As shown in Fig. 3, a clockwise adjustment, sufficient to skew rearwardly the axial lines 18', 18' which are normally skewed forwardly procures the diversion of the conveyed stock toward the smaller (and slower) outer ends of the roller portions 2, 2—a capability of operation which is particularly useful in the handling, for instance, of rolling mill products, where at a given point in the forward movement of the rolled material on the runout from a mill, it is desired to reduce the forward speed as an incident to broadside discharge from the conveyor roller. Fig. 4 is a diagrammatic showing similar to Fig. 3, of the conveyor with its several units swung simultaneously counter-clockwise,—a condition under which both roller portions 1 and 2 of each unit contribute to broadside movement of the stock toward the smaller ends of the roller portions 1, 1,—the stock, of course, in this instance being again subjected to a gradual decrease of its forward speed, due to the decreasing diameter of said roller portions 1 toward their outer ends. In order to preserve the continuity of surface at the supporting portions of the rollers 1 and 2, where they meet at the center line of the conveyor, it may be desirable to form said rollers, on their inner circumferential edges with inter-engaging teeth and projections 24, 24, as shown in Fig. 1.

Figure 7:
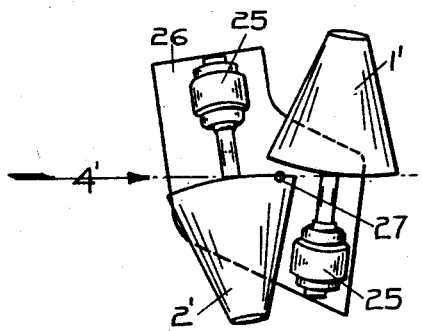
Figs. 7, 8 and 9 are top plan views, illustrating roller unit arrangements involving modifications from the arrangements of Figs. 1 and 2.

The invention is susceptible to modification and variation over a wide range, as to the make-up of the conveyor roller units, their arrangement in the conveyor, and the driving devices therefor,—and a few examples of such modifications and variations will now be referred to. For example, in Fig. 7, I have shown a unit consisting, substantially the same as in Fig. 2, of opposed frusto-conical rollers 1' and 2', with their axes so forwardly skewed with reference to the center line 4' of the conveyor as to counteract or neutralize each other in the normal position illustrated, in respect of lateral deflection tendencies upon the conveyed material, thereby operating the same as the units shown in Fig. 1 to automatically centralize the material on the conveyor. However, said rollers 1' and 2' of the unit shown in Fig. 7 are longitudinally offset, one from the other, so that their inner peripheral portions only overlap a relatively slight distance along the center line; this arrangement gives opportunity for the separate drive of each roller shaft from, for instance, an electric motor, or other individual driving device 25,—the two driving devices and the two rollers being carried on a common base or support 26 which is adapted to swing pivotally on a vertical axis, indicated at 27, thereby to secure, when desired, sidewise movement of the stock in either direction, according to the methods illustrated in Figs. 3 and 4.

Figure 8:
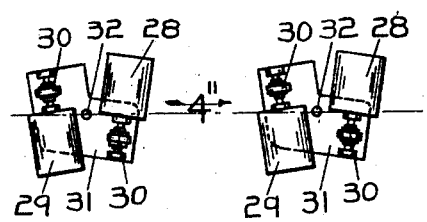

It is also apparent that the invention is not limited in any sense to the use of frusto-conical rollers, for as shown in Fig. 8, the longitudinally offset arrangement of the two rollers that constitute a unit of the conveyor can as well be applied to cylindrical rollers. Such rollers designated 28 and 29, with their axes skewed forwardly in normal position, relative to the center line 4" of the conveyor, may have individual motor drives, if desired, as indicated at 30, 30. In this conveyor construction, the motors 30, 30 and the rollers 28 and 29 of each unit may be mounted on a common base or support 31, that is adapted to be swung on a vertical axis, as indicated at 32, to obtain, when desired, sidewise movement of the conveyed material on the rollers in either direction. With this type of cylindrical roller, the deceleration of the stock, as moved broadside across the surface of the rollers 28 or 29, as the case may be, is not obtained, for the reason that said rollers are of uniform diameter throughout.

Figure 9:
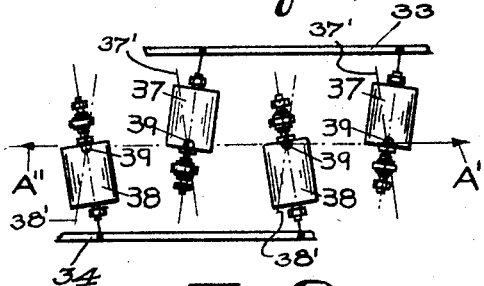

A further modification of the invention is shown in Fig. 9, involving a series of forwardly skewed individually mounted cylindrical rollers 37, 37 on one side of the center line, alternating with a second series of rollers 38, 38 on the other side of said center line,—each of said rollers in the two series being pivoted to swing on a substantially vertical axis, as indicated at 39, 39. When said rollers occupy the positions indicated in Fig. 9, they serve for the movement of stock thereon in the direction of arrow A', and it will be understood that the tendency under these conditions, is to maintain the stock substantially in the center line of the conveyor, due to the forward skewing of the roller axes as above described. When one set or series of said rollers 37 or 38 as the case may be is swung in unison so as to obviate its forward axial skew, the conveyed material is at once shifted broadside from the center line onto the set of rollers so swung, to be discharged broadside from the outer ends of the latter if the axial swinging is carried far enough to skew said rollers rearwardly. On the other hand, if said rollers 37 and 38 occupy the positions indicated by the axial lines 37' and 38', the forward travel of the material on the conveyor is in the direction indicated by the arrow A" and under these conditions said material, in the normal positions of the rollers is maintained substantially in the center line as before; axial shifting of one or the other of these sets of rollers, obtains, as before the broadside movement of said material from the center line onto the set of rollers so shifted, with the possibility of its broadside discharge therefrom if the angular movement is sufficient to skew the roller axes rearwardly. Thus in a conveyor of the type shown in Fig. 9, where the several rollers on opposite sides of the center line are independently mounted and subjected to independent angular movements, the action is completely reversible and enables the conveyor to serve for the longitudinal movement of stock in either direction, as the bars 33 and 34 are set.

Figure 5:
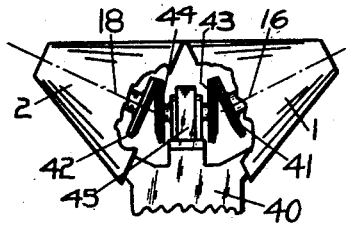
Figs. 5 and 6 are detached views of roller units embodying the invention, illustrating modifications of the driving devices therefor.
Figure 6:
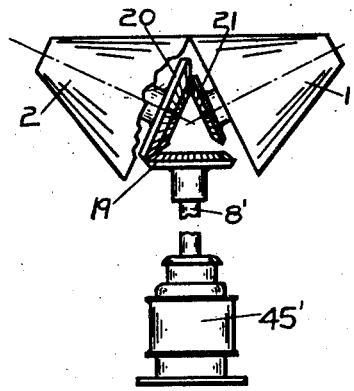

For the drive of opposed frusto-conical rollers, such as shown at 1 and 2, in Fig. 1, a variety of different arrangements can be adopted. For instance, Fig. 5 shows a roller-carrier 40, pivoted on a vertical axis, similarly to the roller-carrier 12 of Fig. 1, said carrier 40 providing suitable bearings, not shown, for the mounting of the skewed and upwardly tilted roller shafts 16 and 18. The latter carry the respective bevel gears 41 and 42, the former in mesh with a bevel gear 43 and the latter in mesh with a bevel gear 44. Said last-mentioned bevel gears 43 and 44 are mounted on opposite shaft extensions of a common driving motor 45 disposed interiorly of the pivoted roller-carrier 40. In Fig. 6, the drive arrangement is the same as in Fig. 1, except that the vertical shaft 8' of the roller unit takes its drive from an electric motor 45', disposed vertically.

Figure 11:
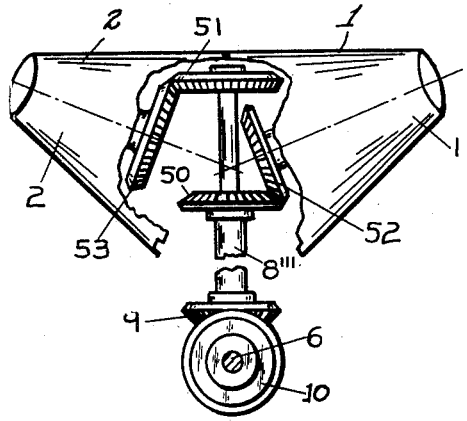
Figs. 10 and 11 are views similar to Figs. 5 and 6, illustrating further variations in the driving devices for roller units embodying the invention.
Figure 10:
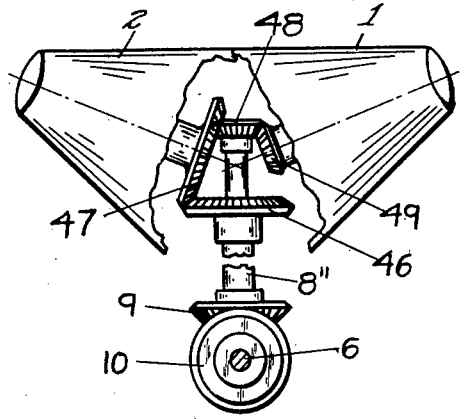

In Fig. 10, as distinguished from Fig. 1, the vertical shaft 8" that transmits the rotation of the drive shaft 6 to the two rollers of the unit, carries a large lower bevel gear 46 to mesh with the bevel gear 47 of roller 2, and a small upper bevel pinion 48 to mesh with the bevel pinion 49 of the other roller 1,—the two rollers thereby being driven in the same direction and at the same speed. In the arrangement of Fig. 11, the vertical shaft 8''' has a pair of opposing bevel gears 50 and 51, more widely spaced than the gears 46 and 48 of Fig. 10, this permitting the reception, without interference between them, of the oppositely inclined gears 52 and 53 of the frusto-conical rollers 1 and 2.

Figure 12:
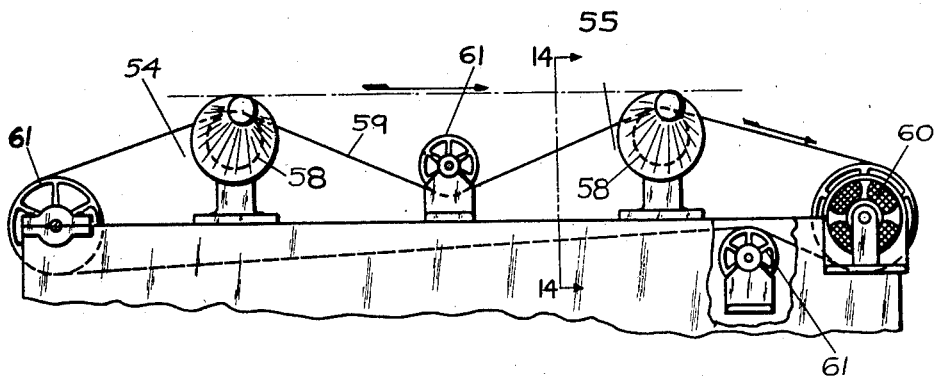
Fig. 12 is a side view, illustrating a belt drive for an assemblage of such roller units.
Figure 13:
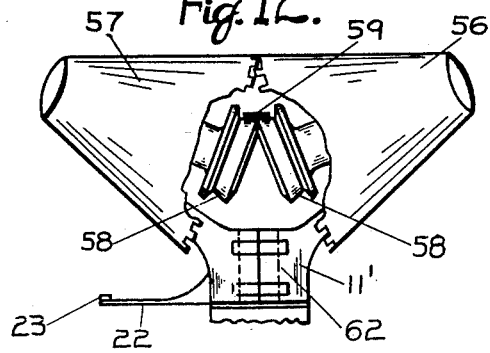
Fig. 13 is a sectional view on the line 13—13 of Fig. 12.

Referring now to Figs. 12 and 13, a conveyor assemblage wherein belt-driven roller units are employed is illustrated,—two of such units 54 and 55 for purposes of illustration, being shown, with the shafts of their respective rollers 56 and 57 carrying adjacent pulleys or sheaves 58, 58. A single endless belt 59, wide enough to make driving contact with both pulleys 58, 58 is driven by a suitable motor 60 and guided by the several sheaves 61, 61, so as to drive all the rollers of the several units in unison. Each unit has the hub 11' of its roller-carrier mounted on a vertical axis provided by a post or column 62, whereby the several units may be swung together by a bar 23 in either direction, for the selective broadside discharge of the conveyed material in the manner shown by Figs. 3 and 4,—the flexible driving belt 59 permitting, of course, the necessary shifting of the pulleys 58, 58.

Figure 14:
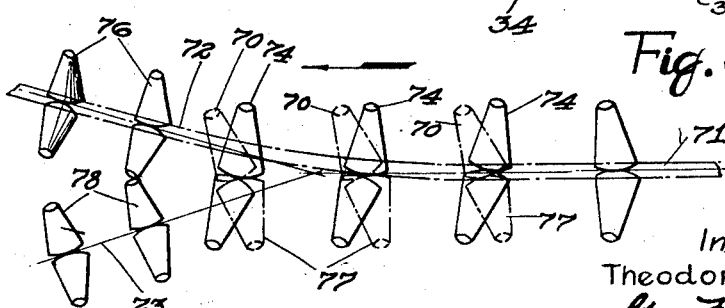
Fig. 14 is a top plan view, somewhat diagrammatic in character, illustrating roller units embodying the invention in a different assemblage, for a special purpose.

Fig. 14 illustrates a further special use of the invention, as applied particularly to the longitudinal movement of elongated material that is bendable laterally in one direction or the other from the line of its forward travel. As shown, a plurality of angularly adjustable double-roller conveyor units 70, 70 of the type shown in Figs. 1 and 2, may be arranged in alinement at a point where a roller conveyor, having a center line designated at 71, makes a pair of divergent branches 72 and 73 from said center line, and where ordinarily a switching device, to direct the material selectively onto the rollers of one or the other of said branches, would be employed. When the several sets of units 70, 70 occupy the positions indicated by the full lines, with the axes of the roller portions 74, 74 tipped backwardly, with reference to the center line 71,—then the flexible material, as shown at 75 is deflected onto the branch conveyor 72, being centralized thereon, if desired, by using for the rollers of said branch conveyor a plurality of alined roller units 76, 76 of the same double frusto-conical construction as contemplated by the invention. Shifting of the roller units 70, 70 into the dotted line positions illustrated in Fig. 16, so that the axes of the roller portions 77, 77 are tipped backwardly with reference to the center line 71, deflects the material onto the branch conveyor 73, which, as herein shown, may be made up, like the branch conveyor 72, of self-centralizing roller units 78, 78.

It is to be noted that the invention provides a roller conveyor which, in respect of confining the path of the conveyed material to the center-line, has the same effect as that produced by grooving the rollers, or by arranging longitudinal guiding surfaces on each side of the center-line to contact with the sides of the conveyed material, in the event of its deviation from a straight path. This effect is obtained, according to the invention, on rollers having flat supporting surfaces, and in the entire absence of any restraint upon or contact with the side edges of the conveyed material,—a factor which makes possible, whenever desired, the material's broadside movement in either direction on the conveyor—which is not possible, of course, when said material travels on grooved rollers or is restrained by side guides.

I claim:

1. A roller conveyor embodying on each side of its center-line a series of rollers, the axes of which are normally forwardly skewed with reference to said center-line for the centralization of the conveyed material thereon, and means for shifting said roller axes in unison to broadside said material in either direction.

2. In a conveyor, a roller unit providing axially-opposed and oppositely-tapered roller portions on opposite sides of the conveyor's center-line, the axis of each portion being normally forwardly skewed with reference to said center-line to procure centralization of the conveyed material, and means for changing the normal position of either axis, to obtain broadsiding of said material in either direction.

3. A series of rollers for the support and longitudinal movement of material, said rollers having their axes so skewed with reference to the line of movement of said material as normally to oppose each other's tendencies for broadside movement of said material away from said line and means for shifting said axes in unison to procure broadside movement of said material in either direction.

4. A series of rollers constituting a conveyor for the support and movement of material along the center-line of said conveyor, said rollers having their axes so skewed with reference to said center-line as normally to produce substantially opposite broadside effects on said material, thereby maintaining it substantially on said center-line and means for shifting said axes in unison to obtain broadside movement of said material in either direction.

5. In a roller conveyor, a pair of juxtaposed rollers one on either side of a vertical plane, each roller being skewed inwardly so as normally to carry the conveyed and supported material toward said plane and means for simultaneously shifting said rollers in unison, to obtain movement of said material in either direction away from said plane.

6. In a roller conveyor, a pair of juxtaposed rollers placed end to end, one on either side of the center line of said conveyor, each roller being skewed inwardly so as normally to carry the conveyed material toward said center line and means for shifting said rollers in unison to carry said material away from said center line in either direction.

7. In a roller conveyor, two series of rollers arranged in tandem on opposite sides of the center-line of the conveyor, with the axis of each roller normally at an angle of more than ninety degrees from said center-line, measured on the side from which the conveyed material is received and means for simultaneously decreasing said angle for the axes of one series of rollers and increasing it for the axes of the other series of rollers, thereby to procure broadsiding movement of the conveyed material in either direction away from said center line.

8. Conveying means of the class described, comprising alined roller units for the support and longitudinal movement of material thereon, each unit consisting of a pair of axially-opposed roller portions having opposite broadside effects on the material being forwarded, whereby normally to secure its forward travel without broadside deviation, and means for shifting said units, to procure the same broadside effects from both roller portions, thereby to move the material diagonally in either direction away from such center line.

9. In a conveyor, a roller unit providing a pair of axially-opposed roller portions on opposite sides of the conveyor's center-line, with the axes of both portions normally skewed forwardly, to produce equal and opposite broadside tendencies operating to hold the conveyed material against deviation from said center-line, and means for reversing at will the skew of said axes, thereby to procure broadside movement of the material in either direction away from said center line as its longitudinal movement continues.

10. Conveying means of the class described, comprising a series of roller units, each composed of a pair of rollers having their axes oppositely skewed, whereby normally to centralize the conveyed material thereon, and a mounting for each unit permitting the latter to be swung on an axis substantially perpendicular to the skewed roller axes, thereby to procure broadsiding of the conveyed material and its discharge from one side or the other of said conveying means.

11. Conveying means of the class described, comprising a series of driven roller units arranged in substantial alinement and each constituted by a pair of rollers in substantially end-to-end relation, with their axes oppositely skewed so as normally to centralize the conveyed material on said conveying means, and means for shifting said units, to reverse the skew of corresponding rollers thereof, thereby to procure broadsiding of the conveyed material and its discharge from one side or the other of said conveying means.

12. Conveying means of the class described, comprising a series of roller units, each consisting of a pair of axially intersecting rollers whose axes are oppositely skewed so as normally to centralize the conveyed material on said conveying means, and means for shifting each of said units about an axis passing through the intersection of its roller axes, to procure broadside discharge of the conveyed material from either side of said conveying means.

13. Conveying means of the class described, comprising a series of roller units, each consisting of a pair of axially-intersecting rollers whose axes are oppositely skewed so as normally to centralize the conveyed material on said conveying means, a common drive shaft geared to each of said rollers, and means for shifting each of said units about the axis of said drive shaft, to procure broadside discharge of the conveyed material from either side of said conveying means.

THEODORE H. NYE.